(12) United States Patent
Campian et al.

(10) Patent No.: US 6,620,882 B1
(45) Date of Patent: Sep. 16, 2003

(54) SOLID SUPPORT TEMPLATE FOR PREPARATION OF HIGHLY FUNCTIONALIZED HETEROCYCLE COMPOUNDS

(75) Inventors: Eugene Campian, Louisville, KY (US); Boliang Lou, Louisville, KY (US); Kexin Yang, Louisville, KY (US); Jinfang Zhang, Louisville, KY (US)

(73) Assignee: Advanced Syntech, LLC, Louisville, KY (US)

( * ) Notice: Subject to any disclaimer, the term of this patent is extended or adjusted under 35 U.S.C. 154(b) by 0 days.

(21) Appl. No.: 10/275,058
(22) PCT Filed: Jan. 9, 2001
(86) PCT No.: PCT/US01/00823

§ 371 (c)(1),
(2), (4) Date: Oct. 31, 2002

(87) PCT Pub. No.: WO01/83575
PCT Pub. Date: Nov. 8, 2001

Related U.S. Application Data (60) Provisional application No. 60/201,285, filed on May 2, 2000.
(51) Int. Cl.$^7$ .................................................. C08F 8/32
(52) U.S. Cl. ................ 525/54.1; 525/54.11; 525/332.2; 525/374
(58) Field of Search .............................. 525/332.2, 374, 525/54.1, 54.11

(56) References Cited

U.S. PATENT DOCUMENTS

| | | |
|---|---|---|
| 5,856,506 A | 1/1999 | Lazo et al. |
| 5,872,262 A | 2/1999 | Dolle, III et al. |
| 5,932,695 A | 8/1999 | Floyd et al. |
| 6,117,940 A | 9/2000 | Mjalli |

*Primary Examiner*—Bernard Lipman
(74) *Attorney, Agent, or Firm*—Stites & Harbison; John E. Vanderburgh (57) ABSTRACT

The present invention relates to a novel solid support template of Formula (I) and methods for producing novel highly functionalized imidazoles, pyrazinones and benzodiazepinones through a plurality of chemical reactions utilizing the solid support template

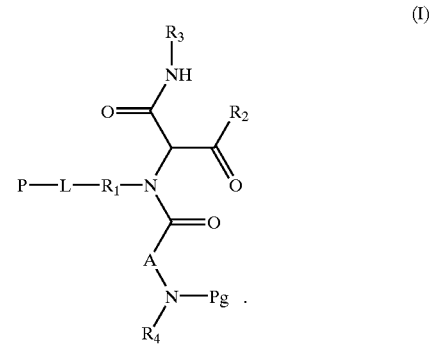

(I)

23 Claims, 2 Drawing Sheets

Examples of the Solid Support Template, Formula 1

Example 1

Example 2

Example 3

Example 4

Example 5

Example 6

Example 7

(R) = Rink resin (W) = Wang resin

(M) = Merrifield resin

Figure 1

Heterocyclic compounds synthesized via the solid support template, Formula 1

Example 8     Example 9     Example 10

Example 11     Example 12

Example 13     Example 14     Example 15

Figure 2

SOLID SUPPORT TEMPLATE FOR PREPARATION OF HIGHLY FUNCTIONALIZED HETEROCYCLE COMPOUNDS

CROSS REFERENCE TO RELATED APPLICATIONS

This application claims the benefit of priority of U.S. Provisional application Ser. No. 60/201,285, filed May 2, 2000.

FIELD OF THE INVENTION

The present invention relates to a novel solid support template of Formula 1 and methods for producing novel highly functionalized imidazoles, pyrazinones and benzodiazepinones through a plurality of chemical reactions utilizing the solid support template.

Formula 1

BACKGROUND OF INVENTION

Heterocyclic compounds occupy a very important position in the arsenal of clinically useful therapeutic agents. Because of the beneficial medicinal effects of members of this vast class of compounds, interest remains strong for the synthesis of novel heterocyclic compounds and known heterocyclic ring systems where there is ample novel chemistry left to explore.

Advances in molecular biology and application of automated techniques in biological screening allow the testing of a large number of compounds to be carried out rapidly and efficiently. The field of combinatorial chemistry has arisen largely out of the need to synthesize larger numbers of diverse compounds more rapidly than conventional organic synthesis techniques permit, to keep pace with high throughput biological screening capabilities. The present invention introduces a novel method based a solid support template for the efficient preparation of a wide range of novel and highly substituted heterocycles in large numbers.

Chemical synthesis of heterocyclic organic molecules on solid phase support has received considerable attention in recent years (Corbett, J. W., Org. Prep. Proc. Int., 1998, 30, 489; Nefzi, A., Ostresh, J. M., Houghten, R. A., 1997, 97, 449; Hermkens, P. H. H., Ottenheijm, H. C. J. and Rees, D. C., *Tetrahedron* 1997, 53, 5643–5678; Balkenhohl, F., von dem Bussche-Hunnefeld, C., Lansky, A. and Zechel, C., *Angew. Chem. Int. Ed. Engl.* 1996, 35, 2288–2337; Hermkens, P. H. H., Ottenheijm, H. C. J. and Rees, D. C., *Tetrahedron* 1996, 52, 4527–4554).

In most solid phase syntheses of heterocyclic compounds a single heterocyclic scaffold is produced where substitution from appropriate positions on the heterocycle permits numerous analogues to be made that all possess is the same heterocyclic scaffold. In order to prepare a different heterocyclic scaffold, as well as the substituents on the scaffold, requires that a new synthetic approach must be used. This oftentimes requires significant effort and time to optimize the synthetic procedure by which novel heterocyclic compounds can be prepared.

Recently published work (by Keating, T. A. and Armstrong, R. W., *J. AM. Chem. Soc.* 1996, 118, 2574–2583) has demonstrated the synthesis of several heterocyclic & acyclic compounds from a common cyclohexenamide Ugi reaction product in solution phase (see scheme A). Chemical modification of the cyclohexenamide under acidic conditions leads to a munchnone intermediate (see scheme A) which reacts with a number of nucleophiles (alcohols and mercaptans), inter- or intramolecularly, and also dipolarophiles (disubstituted acetylenes) to form the products shown in scheme A.

Scheme A
Generation of Diverse Compounds Based on a Common Core

U gi four component condensation reaction

The synthetic strategy using the Ugi cyclohexenamide allows not only the generation of analogues of the same scaffold but also the synthesis of novel scaffolds, eg. 1,4-benzodiazepinone, pyrrole, 2-acetamido-2-deoxy-D-manno-δ-lactone and several acyclic modified Ugi products.

There is a need in the field of combinatorial chemistry for highly efficient synthetic methods like the example in scheme A for accessing a wide range of compounds that possess structural diversity in the scaffold, as well as, large numbers of analogues of single scaffolds. The synthetic method in the present invention allows the synthesis of large numbers of heterocyclic compounds on solid support where not only the side chains can be easily varied but also many unique heterocyclic scaffolds are synthesized from the same building block.

The present invention relates to a novel solid support template and its use for preparing many novel heterocyclic scaffolds and analogues thereof.

SUMMARY OF INVENTION

The present invention relates to a solid support template of Formula 1, wherein

Formula 1

P is the solid support, and include the following:
a.) beads, pellets, disks, fibers, gels, or particles such as cellulose beads, pre-glass beads, silica gels, polypropylene beads, polyacrylamide beads, polystyrene beads that are lightly cross-linked with 1–2% divinylbenzene and optionally grafted with polyethylene glycol and optionally functionalized with amino, hydroxy, carboxy or halo groups; and b.) soluble supports such as low molecular weight non-cross-linked polystyrene and polyethylene glycol.

The term solid support is used interchangeably with the term resin or bead in this invention and is intended to mean the same thing.

L is a suitable linker, a multifunctional chemical monomer in which one functional group reacts with the polymer to form a covalent bond and the other functional group reacts with $R_1$ through a plurality of chemical reactions to provide the desired templates for further chemistry. Commercially available resins, like Rink resin, Wang resin and Hydroxymethyl polystyrene are useful in this method. The linkers present in these resins allow the cleavage of final products by a variety of mild chemical conditions that allow isolation of compounds of this invention. The hydroxymethyl polystyrene resin, the Wang resin and the Rink resin are examples of solid phase supports used in the preparation of compounds of this invention. Other known or commercially available solid phase supports work in this method and are considered to lie within the scope of this invention.

$R_1$ is selected from a group consisting of a covalent bond or a multifunctional chemical monomer possessing at least two attachment points which link nitrogen in the template backbone and the linker L. An example of such a monomer is derived from an amino acid, such Phenylalanine or β-alanine.

A is selected from the group consisting of

-continued

Pg is a protecting group which includes but not limited to Fmoc, Boc, Alloc;

$R_2$, $R_3$, $R_4$, $R_5$, $R_6$ and $R_7$ are independently selected from a group consisting of hydrogen, substituted alkyl, substituted alkenyl, substituted alkenylaxyl, substituted alkynyl, substituted aryl, substituted heteroaryl, substituted alkylaryl, substituted cycloalkyl and substituted cycloalkenyl, substituted heterocyclyl; or $R_4$ and $R_5$ taken in combination, are substituted saturated heterocyles; or $R_6$ and $R_7$ taken in combination, are substituted cycloalkyl and substituted saturated heterocyles;

$R_8$ and $R_9$ taken in combination are substituted aromatic or heteroaromatic rings;

DETAILED DESCRIPTION OF THE INVENTION

As used above, and through the description of the invention, the following terms, unless otherwise indicated, shall be understood to have the following meanings:

Definitions

"Alkyl" means a saturated aliphatic hydrocarbon group which may be straight or branched and having about 1 to about 20 carbons in the chain. Branched means that a lower alkyl group such as methyl, ethyl, or propyl is attached to a linear alkyl chain. Preferred straight or branched alkyl groups are the "lower alkyl" groups which are those alkyl groups having from 1 to about 6 carbon atoms.

"Alkenyl" means an aliphatic hydrocarbon group defined the same as for "alkyl" plus at least one double bond between two carbon atoms anywhere in the hydrocarbon.

"Alkynyl" means an aliphatic hydrocarbon group defined the same as for "alkyl" plus at least one triple bond between two carbon atoms anywhere in the hydrocarbon.

"Aryl" represents an unsubstituted, mono-, di- or trisubstituted monocyclic, polycyclic, biaryl aromatic groups covalently attached at any ring position capable of forming a stable covalent bond, certain preferred points of attachment being apparent to those skilled in the art. Aryl thus contains at least one ring having at least 5 atoms, with up to two such rings being present, containing up to 10 atoms therein, with alternating (resonating) double bonds between adjacent carbon atoms. Aryl groups may likewise be substituted with 0–3 groups selected from $R_s$. The definition of aryl includes but is not limited to phenyl, biphenyl, indenyl, fluorenyl, naphthyl (1-naphtyl, 2-naphthyl).

Heteroaryl is a group containing from 5 to 10 atoms, 1–4 of which are heteroatoms, 0–4 of which heteroatoms are nitrogen, and 0–1 of which are oxygen or sulfur, said heteroaryl groups being substituted with 0–3 groups selected from $R_8$. The definition of heteroaryl includes but is not limited to pyridyl, furyl, thiophenyl, indolyl, thiazolyl, imidazolyl, benzimidazolyl, tetrazolyl, pyrazinyl, pyrimidyl, quinolyl, isoquinolyl, benzofuryl, isothiazolyl, benzothienyl, pyrazolyl, isoindolyl, isoindolyl, purinyl, carbazolyl, oxazolyl, benzthiazolyl, benzoxazolyl, quinoxalinyl, quinazolinyl, and indazolyl.

"Azacycloalkane" means a saturated aliphatic ring containing a nitrogen atom. Preferred azacycloalkanes include pyrrolidine, piperidine and azepine.

"Cycloalkyl" means a saturated carbocyclic group having one or more rings and having 3 to about 10 carbon atoms. Preferrd cycloalkyl groups include cyclopropyl, cyclobutyl, cyclopentyl, cyclohexyl, cycloheptyl, and decahydronaphthyl.

"heterocyclyl" means an about 4 to about 10 member monocyclic or multicyclic ring system wherein one or more of the atoms in the ring system is an element other than carbon chosen amongst nitrogen, oxygen or sulfur. The heterocyclyl may be optionally substituted by one or more alkyl group substituents. Examplary heterocyclyl moieties include quinuclidine, pentametliylenesulfide, tetrahedropyranyl, tetrahydrothiophenyl, pyrrolidinyl or tetrahydrofuranyl.

"Carbocyles" means one or more rings having 5 to about 10 carbon atoms that possess at least one degree of unsaturation. Preferred carbocylces include cyclopentene, cyclohexene, cycloheptene, indene, di-, tetra-, and hexahydro-indene, naphthalene, and hexa- and octahydro-naphthalene.

"Saturated" means that the atom possesses the maximum number of single bonds either to hydrogen or to other atoms, eg. a carbon atom is $sp^3$ hybridized.

"Unsaturated" means that the atom possesses less than the maximum number of single bonds either to hydrogen or to other atoms, eg. a carbon atom is $sp^2$ or $sp^3$ hybridized.

"Substituted" means the attachment of any of the following groups, including:
(i) H
(ii) alkyl
(iii) aryl
(iv) amino, amidino, bromo, chloro, carbony, carboxamido, thiocarboxy, cyano, fluoro, guanidino, hydroxy, iodo, nitro, oxo, thiol, trihalomethyl, trihalomethoxy
(v) N-($C_1$–$C_6$alkyl)amidino and N-aryl amidino
(vi) N-($C_1$–$C_6$alkyl)guanidino and N-aryl guanidino
(vii) $C_1$–$C_6$alkylamino and arylamino
(viii) N,N'-($C_1$–$C_6$dialkyl)amino, N,N'-diarylamino and N-($C_1$–$C_6$alkyl)-N'-(aryl)amino
(ix) $C_1$–$C_6$alkylarylamino and aryl$C_1$–$C_6$alkylamino
(x) 4-, 5-, 6-, or 7-membered azacycloalkanes
(xi) $C_1$–$C_6$alkyloxy and aryloxy
(xii) $C_1$–$C_6$alkylaryloxy and aryl$C_1$–$C_6$alkyloxy
(xiii) $C_1$–$C_6$alkylarylthio and aryl$C_1$–$C_6$alkylthio
(xiv) $C_1$–$C_6$alkylcarbonyl and arylcarbonyl
(xv) $C_1$–$C_6$alkylarylcarbonyl and aryl$C_1$–$C_6$alkylcarbonyl
(xvi) $C_1$–$C_6$alkoxycarbonyl and aryloxycarbonyl
(xvii) $C_1$–$C_6$alkylaryloxycarbonyl and aryl$C_1$–$C_6$alkyloxycarbonyl
(xviii) $C_1$–$C_6$alkylarylthiocarbonyl and aryl$C_1$–$C_6$alkylthiocarbonyl
(xix) N-mono-($C_1$–$C_6$alkyl) and N,N'-di-($C_1$–$C_6$alkyl)aminocarbonyl
(xx) N-mono-(aryl) and N,N'-di-(aryl)aminocarbonyl
(xxi) N,N'-($C_1$–$C_6$alkyl) (aryl)aminocarbonyl
(xxii) N-mono-($C_1$–$C_6$alkylaryl) and N,N'-di-(aryl$C_1$–$C_6$alkyl)aminocarbonyl (xxiii) N,N'-($C_1$–$C_6$alkyl) (aryl$C_1$–$C_6$alkyl)aminocarbonyl
(xxiv) N,N'-(aryl) (aryl$C_1$–$C_6$alkyl)aminocarbonyl
(xxv) $C_1$–$C_6$alkylcarbonylamino and arylcarbonylamino
(xxvi) $C_1$–$C_6$alkylarylcarbonylamino and aryl$C_1$–$C_6$alkylcarbonylamino
(xxvii) $C_1$–$C_6$alkoxycarbonylamino and aryloxycarbonylamino
(xxviii) $C_1$–$C_6$alkylaryloxycarbonylamino and aryl$C_1$–$C_6$alkyloxycarbonylamino
(xxix) $C_1$–$C_6$alkylarylthiocarbonylamino and aryl$C_1$–$C_6$alkylthiocarbonylamino
(xxx) N-mono-($C_1$–$C_6$alkyl) and N,N'-di-($C_1$–$C_6$alkyl)aminocarbonylamino
(xxxi) N-mono-(aryl) and N,N'-di-(aryl)aminocarbonylamino
(xxxii) N,N'-($C_1$–$C_6$alkyl) (aryl)aminocarbonylamino
(xxxiii) N-mono-($C_1$–$C_6$alkylaryl) and N,N'-di-(aryl$C_1$–$C_6$alkyl) aminocarbonylamino
(xxxiv) N,N'-($C_1$–$C_6$alkyl)(aryl$C_1$–$C_6$alkyl)aminocarbonylamino
(xxxv) N,N'-(aryl) (aryl$C_1$–$C_6$alkyl)aminocarbonylamino
(xxxvi) $C_1$–$C_6$alkylcarbonyl and arylcarbonyloxy
(xxvvii) $C_1$–$C_6$alkylarylcarbonyloxy and aryl$C_1$–$C_6$alkylcarbonyloxy
(xxxviii) $C_1$–$C_6$alkoxycarbonyloxy and aryloxycarbonyloxy
(xxxix) $C_1$–$C_6$alkylaryloxycarbonyloxy and aryl$C_1$–$C_6$alkyloxycarbonyloxy
(xl) $C_1$–$C_6$alkylarylthiocarbonyloxy and aryl$C_1$–$C_6$alkylthiocarbonyloxy
(xli) N-mono-($C_1$–$C_6$alkyl) and N,N'-di-($C_1$–$C_6$alkyl)aminocarbonyloxy
(xlii) N-mono-(aryl) and N,N'-di-(aryl)aminocarbonyloxy
(xliii) N,N'-($C_1$–$C_6$alkyl) (aryl)aminocarbonyloxy
(xliv) N-mono-($C_1$–$C_6$alkylaryl) and N,N'-di-(aryl$C_1$–$C_6$alkyl) aminocarbonyloxy
(xlv) N,N'-($C_1$–$C_6$alkyl)(aryl$C_1$–$C_6$alkyl)aminocarbonyloxy and N,N'-(aryl)(aryl$C_1$–$C_6$alkyl)aminocarbonyloxy
(xlvi) $C_1$–$C_6$alkylsulfoxy and arylsulfoxy
(xlvii) $C_1$–$C_6$alkylarylsulfoxy and aryl$C_1$–$C_6$alkylsulfoxy
(xlviii) $C_1$–$C_6$alkylsulfonyl and aryl sulfonyl
(xlix) $C_1$–$C_6$alkylarylsulfonyl and aryl$C_1$–$C_6$alkylsulfonyl
(l) $C_1$–$C_6$alkylsulfonamido and arylsulfonamido
(li) $C_1$–$C_6$alkylarylsulfonamido and aryl$C_1$–$C_6$alkylsulfonamido
(lii) $C_1$–$C_6$alkylaminosulfonyl and arylaminosulfonyl
(liii) $C_1$–$C_6$alkylarylaminosulfonyl and aryl$C_1$–$C_6$alkylaminosulfonyl
(liv) $C_1$–$C_6$alkylaminosulfonamido and arylaminosulfonamido
(lv) $C_1$–$C_6$alkylarylsulfonamido and aryl$C_1$–$C_6$alkylsulfonamido "Alkyl" and "aryl" used for any of the groups in the above list also means substituted alkyl or substituted aryl, where substituted means groups selected from the same list.

Preferred Embodiments

A preferred solid support template of the present invention is the template of Formula 1 wherein $R_1$ is a covalent bond and A is derived from an N-protected a-amino acid can be presented as Formula 1a, Formula 1a wherein
$R_2$, $R_3$, $R_4$ and $R_5$ are independently selected from a group consisting of hydrogen, substituted alkyl, substituted alkenyl, substituted alkenylaryl, substituted alkynyl, substituted aryl, substituted heteroaryl, substituted alkylaryl, substituted cycloalkyl and substituted cycloalkenyl, substituted heterocyclyl; or

$R_4$ and $R_5$ taken in combination, are substituted saturated heterocycles;

Another preferred solid support template of the present invention is the template of Formula 1 wherein $R_1$ is derived from an α- or β-amino acid, can be presented as Formula 1b, wherein Formula 1b X is O, NH or S;
n is 0 or 1;
A is Pg is a protecting group which includes but not limited to Fmoc, Boc, Alloc;
$R_2$, $R_3$, $R_4$, $R_5$, $R_6$, $R_7$, $R_{10}$ and $R_{11}$ are independently selected from a group consisting of hydrogen, substituted alkyl, substituted alkenyl, substituted alkenylaryl, substituted alkynyl, substituted aryl, substituted alkylaryl, substituted cycloalkyl and substituted cycloalkenyl; or R$_{10}$ is selected from a group consisting of substituted amino, substituted hydroxyl, substituted sulfhydryl, substituted alkyl sulfonamido, substituted alkyl carboxamido, substituted alkyl ureido, substituted alkyl sulfamido, substituted alkyloxycarboxamido, substituted arylalkyl sulfonamido, substituted arylalkyl carboxamido, substituted arylalkyl ureido, arylalkyl sulfamido and substituted arylalkyloxycarboxamido; or

R$_4$ and R$_5$ taken in combination, are substituted saturated heterocyles; or R$_6$ and R$_7$ taken in combination, are substituted cycloalkyl and substituted saturated heterocycles;

R$_8$ and R$_9$ taken in combination are substituted aromatic or heteroaromatic rings;

Another preferred solid support template of the present invention is the template of Formula 1 wherein R$_1$ is derived from an 2-amino-benzoic acid and A is derived from an α-amino acid, can be presented as Formula 1c, Formula 1c wherein
X is O, NH or S;
Pg is a protecting group which includes but not limited Fmoc, Boc, Alloc;

R$_2$, R$_3$, R$_4$, and R$_5$ are independently selected from a group consisting of hydrogen, substituted alkyl, substituted alkenyl, substituted alkenylaryl, substituted alkynyl, substituted aryl, substituted alkylaryl, substituted cycloalkyl and substituted cycloalkenyl; or R$_4$ and R$_5$ taken in combination, are substituted saturated heterocyles;

R$_{12}$ is selected from a group consisting of hydrogen, hydroxy, thio, cyano, halogen, nitro, substituted alkylamino, substituted arylamino, substituted alkylcarbonylamino, substituted arylcarbonylamino, substituted alkyloxy, substituted aryloxy, substituted thioalkyl, substituted thioaryl, substituted alkyl, substituted alkenyl, substituted alkenylaryl, substituted alkynyl, substituted aryl, substituted alkylaryl, substituted cycloalkyl and substituted cycloalkenyl.

Solid Support

Solid support is a substrate consisting of a polymer, cross-linked polymer, functionalized polymeric pin, or other insoluble material. These polymers or insoluble materials have been described in literature and are known to those who are skilled in the art of solid phase synthesis (Stewart J M, Young J. D.; Solid Phase Peptide Synthesis, 2nd Ed; Pierce Chemical Company: Rockford. Ill., 1984). Some of them are based on polymeric organic substrates such as polyethylene, polystyrene, polypropylene, polyethylene glycol, polyacrylamide, and cellulose. Additional types of supports include composite structures such as grafted copolymers and polymeric substrates such as polyacrylamide supported within an inorganic matrix such as kieselguhr particles, silica gel, and controlled pore glass.

Examples of suitable support resins and linkers are given in various reviews (Barany, G.; Merrifield, R. B. "Solid Phase Peptide Synthesis", in "The Peptides—Analysis, Synthesis, Biology". Vol 2, [Gross, E. and Meienhofer, J., Eds.], Academic Press, Inc., New York, 1979, pp 1–284; Backes, B. J.; Ellman, J. A. Curr. Opin. Chem. Biol. 1997. 1, 86; James, I. W., Tetrahedron 1999, 55, 4855–4946) and in commercial catalogs (Advanced ChemTech, Louisville, Ky; Novabiochem, San Diego, Calif.). Some examples of particularly useful functionalized resin/linker combinations that are meant to be illustrative and not limiting in scope are shown below:

(1) Aminomethyl polystyrene resin (Mitchell, A. R., et al., J. Org. Chem., 1978, 43, 2845):

This resin is the core of a wide variety of synthesis resins. The amide linkage can be formed through the coupling of a carboxylic acid to amino group on solid support resin under standard peptide coupling conditions. The amide bond is usually stable under the cleavage conditions for most acid labile, photo labile and base labile or nucleophilic linkers.

(2) Wang resin (Wang, S. S.; J. Am. Chem. Soc. 1973, 95, 1328–

1333). Wang resin is perhaps the most widely used of all resins for acid substrates bound to the solid support resin. The linkage between the substrate and the polystyrene core is through a 4-hydroxybenzyl alcohol moiety. The linker is bound to the resin through a phenyl ether linkage and the carboxylic acid substrate is usually bound to the linker through a benzyl ester linkage. The ester linkage has good stability to a variety of reaction conditions, but can be readily cleaved under acidic conditions, such as by using 25% TFA in DCM.

(3) Rink resin (Rink, H.; Tetrahedron Lett. 1987, 28, 3787).

Rink resin is used to prepare amides utilizing the Fmoc strategy. It has also found tremendous utility for a wide range of solid phase organic synthesis protocols. The substrate is assembled under basic or neutral conditions, then the product is cleaved under acidic conditions, such as 10% TFA in DCM.

(4) Knorr resin (Bernatowicz, M. S., et al. Tetrahedron Lett., 1989, 30, 4645).

Knorr resin is very similar to Rink resin, except that the linker has been modified to be more stable to TFA.

(5) PAL resin (Bernatowicz, M. S., et al. Tetrahedron lett., 1989, 30, 4645).

(6) HMBA-MBHA Resin (Sheppard, R. C., et al., Int. J. Peptide Protein Res. 1982, 20, 451).

(7) HMPA resin. This also is an acid labile resin which provides an alternative to Wang resin and represented as:

(8) Benzhydrylamine copoly(styrene-1 or 2%-divinylbenzene) which referred to as the BHA resin (Pietta, P. G., et al., J. Org. Chem. 1974, 39, 44).

(9) Methyl benzhydrylamine copoly(styrene-1 or 2%-divinylbenzene) which is referred to as MBHA and represented as:

(10) Trityl and functionalized Trityl resins, such as aminotrityl resin and amino-2-chlorotrityl resin (Barlos, K.; Gatos, D.; Papapholiu, G.; Schafer, W.; Wenqing, Y.; Tetrahedron Lett. 1989, 30, 3947).

(11) Sieber amide resin (Sieber, P.; Tetrahedron Lett. 1987, 28, 2107).

(12) Rink acid resin (Rink, H., Tetrahedron Lett., 1987, 28, 3787).

(13) HMPB-BHA resin (4-hydroxymethyl-3-methoxyphenoxybutyric acid-BHA Florsheimer, A.; Riniker, B. in "Peptides 1990; Proceedings of the 21$^{st}$ European Peptide Symposium", [Giralt, E. and Andreu, D. Eds.], ESCOM, Leiden, 1991, pp 131.

(14) Merrifield resin—Chloromethyl co-poly(styrene-1 or 2%-divinylbenzene)

which can be represented as:

A carboxylic acid substrate is attached to the resin through nucleophilic replacement of chloride under basic conditions. The resin is usually stable under acidic conditions, but the products can be cleaved under basic and nucleophilic conditions in the presence of amine, alcohol, thiol and $H_2O$.

(15) Hydroxymethyl polystyrene resin (Wang, S. S., J. Org. Chem., 1975, 40, 1235).

The resin is an alternative to the corresponding Merrifield resin, whereas the substrate is attached to a halomethylated resin through nucleophilic displacement of halogen on the resin, the attachment to hydroxymethylated resins is achieved by coupling of activated carboxylic acids to the hydroxy group on the resin or through Mitsunobu reactions. The products can be cleaved from the resin using a variety of nucleophiles, such as hydroxides, amines or alkoxides to give carboxylic acids, amides and esters.

(16) Oxime resin (DeGrado, W. F.; Kaiser, E. T.; J.Org. Chem. 1982, 47, 3258).

This resin is compatible to Boc chemistry. The product can be cleaved under basic conditions.

(16) Photolabile resins (e.g. Abraham, N. A. et al.; Tetrahedron Lett. 1991, 32, 577). The products can be cleaved from these resins photolytically under neutral or mild conditions, making these resins useful for preparing pH sensitive compounds. Examples of the photolabile resins include:

(a) ANP resin:

(b) alpha-bromo-alpha-methylphenacyl polystyrene resin:

(17) Safety catch resins (see resin reviews above; Backes, B. J.; Virgilio, A. A.; Ellman, J. Am. Chem. Soc. 1996, 118, 3055–6). These resins are usually used in solid phase organic synthesis to prepare carboxylic acids and amides, which contain sulfonamide linkers stable to basic and nucleophilic reagents. Treating the resin with haloacetonitriles, diazomethane, or $TMSCHN_2$ activates the linkers to attack, releasing the attached carboxylic acid as a free acid, an amide or an ester depending on whether the nucleophile is a hydroxide, amine, or alcohol, respectively. Examples of the safty catch resins include:

(a) 4-sulfamylbenzoyl-4'-methylbenzhydrylamine resin:

(b) 4-sulfamylbutryl-4'-methylbenzhydrylamine resin:

(18) TentaGel resins:

TentaGel resins are polyoxyethyleneglycol (PEG) grafted (Tentagel) resins (Rapp, W.; Zhang, L.; Habich, R.; Bayer, E. in "Peptides 1988; Proc. 20$^{rth}$ European Peptide Symposium" [Jung,G. and Bayer, E., Eds.], Walter de Gruyter, Berlin, 1989, pp 199–201. TentaGel resins, e.g. TentaGel S Br resin can swell in a wide variety of solvents and the bead size distribution is very narrow, making these resins ideal for solid phase organic synthesis of combinatorial libraies. TentaGel S Br resin can immobilize carboxylic acids by displacing the bromine with a carboxylic acid salt. The products can be released by saponification with dilute aqueous base.

(19) Resins with silicon linkage (Chenera, B.; Finkelstein, J. A.; Veber, D. F.; J. Am. Chem. Soc. 1995, 117, 11999–12000; Woolard, F. X.; Paetsch, J.; Ellman, J. A.; J. Org. Chem. 1997, 62, 6102–3). Some examples of these resins contain protiodetachable arylsilane linker and traceless silyl linker. The products can be released in the presence of fluoride.

Also useful as a solid phase support in the present invention are solubilizable resins that can be rendered insoluble during the synthesis process as solid phase supports. Although this technique is frequently referred to as "Liquid Phase Synthesis", the critical aspect for our process is the isolation of individual molecules from each other on the resin and the ability to wash away excess reagents following a reaction sequence. This also is achieved by attachment to resins that can be solubilized under certain solvent and reaction conditions and rendered insoluble for isolation of reaction products from reagents. This latter approach, (Vandersteen, A. M.; Han, H.; Janda, K. D.; Molecular Diversity, 1996, 2, 89–96.) uses high molecular weight polyethyleneglycol as a solubilizable polymeric support and such resins are also used in the present invention.

Preparation of the templates

This template can be assembled in one step on the solid support as described in Scheme 1.

Under the standard Ugi four-component condensation reaction, a polymer-bound free amine 1-1 reacts with an α-ketoaldehyde, an isocyanide and an N-protected amino acid to give the desired template of Formula 1. A variety of solvents are suitable for this reaction, such as THF, MeOH, MeCN or a mixture of THF and MeOH, etc.

Synthesis of novel heterocycle scaffolds using the template

Scheme 2–4 outline the application of the solid support template to the synthesis of a variety of novel scaffolds containing pharmaceutically important heterocyclic rings, such as imidazole, pyrazinone, diazepinone and benzodiazepine. As shown in Scheme 2, cleavage of the N-protecting group leads to the corresponding free amine intermediate of formula 2-1 which is simultaneously cyclized to a dihydropyrazinone or a diazepinone of formula 2-2. The dihydropyrazinone may be oxidized in air resulting in a pyrazinone. The cyclization as well as the oxidation may be catalyzed in the presence of an appropriate acid, such as HOAc. The oxidation can be pushed to completion by using an oxidizing agent, such DDQ or ammonium cerium nitrate (CAN). The products, such as Example 8, Example 9 and Example 11, can be released under appropriate cleavage conditions.

Scheme 2

Scheme 3 refers the method for the preparation of imidazole-based scaffolds. Under an appropriate condition, such as $NH_4OAc/HOAc$, the Formula 1 is converted into an imidazole intermediate which is then deprotected to give an intermediate of formula 3-2. Subsequently, the amino group reacts with a variety of electrophilic reagents, such sulphonyl chloride, isocyanate, acid chloride and aldehyde, to give a polymer-bound product which can be cleaved under appropriate conditions (Example 10 and Example 12).

A cyclative cleavage strategy can be applied if $R_1$ group links to the linker L through an ester bond as shown in Scheme 4. From the polymer-bound intermediates of formula 4-1 and 4-3, the cyclative cleavage under appropriate conditions gives lactam products such as Example 13 and Example 14 shown in Scheme 4.

Cleavage of compounds from solid support depends on the nature of the solid support used in the synthesis. The react and release strategy can be performed on a Merrifield (hydroxymethyl polystyrene resin), Wang resin, Hydroxymethylbenzoic (HMBA) acid resin and Hydroxymethylphenoxy functionalized Tentagel resin to name a few. Cleavage of compounds under mild acidic conditions like trifluoroacetic acid (20–95%) is done with Benzhydrylamine or Rink type resins and Wang resins among others. Cleavage of substrates from solid support by reaction with nucleophiles like ammonia, methylamine, hydroxylamine, methanol and triethylamine is done from Hydroxymethylpolystyrene and HMBA resins to give compounds as their carboxamides, hydroxamic acids and methyl esters. Other known or commercially available resins are considered within the scope of this invention.

EXAMPLES

Figure 1:
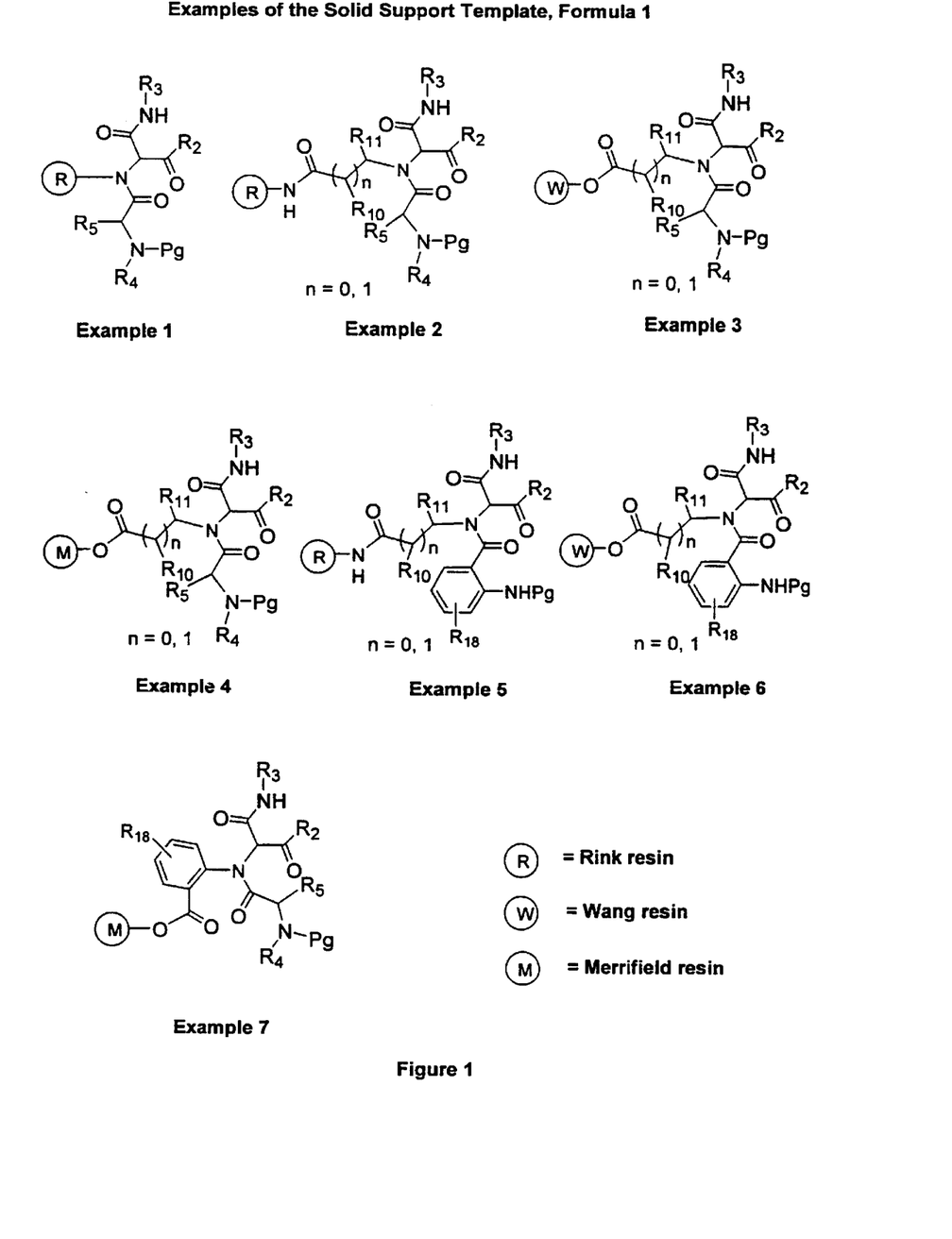
FIG. 1 illustrates structural formulas for compounds made in accordance with Examples 1–7.
Figure 2:
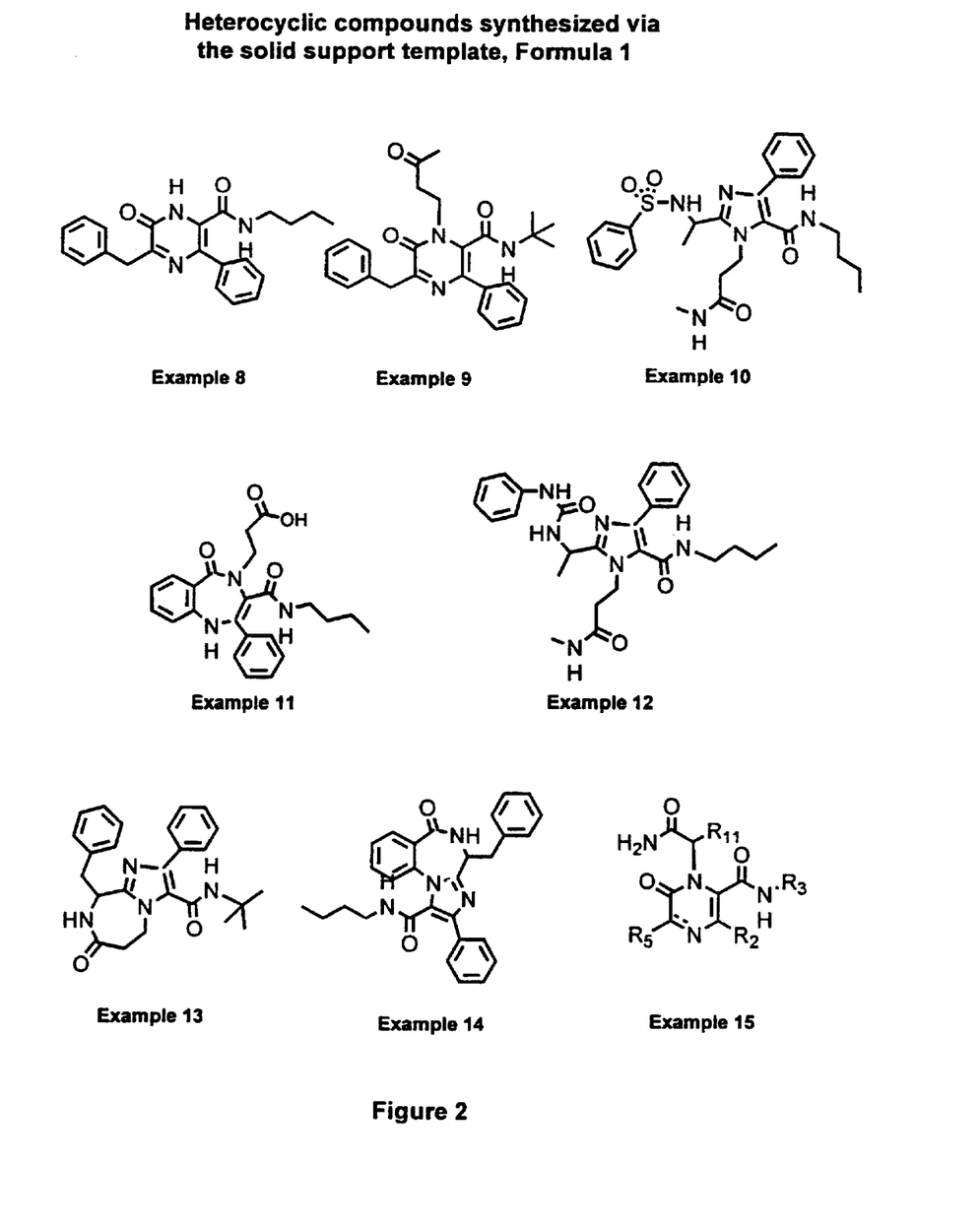
FIG. 2 illustrates structural formulas for compounds made in accordance with Examples 8–15.

The following examples (FIGS. 1 and 2) are by way of illustration of various aspects of the present invention and are not intended to be limiting thereof.

General Procedures-Reagent Systems and Test Methods

Anhydrous solvents were purchased from Aldrich Chemical Company and used directly. Resins were purchased from Advanced ChemTech, Louisville, Ky., and used directly. The loading level ranged from 0.60 to 1.0 mmol/g. Unless otherwise noted, reagents were obtained from commercial suppliers and used without further purification. Preparative thin layer chromatography was preformed on silica gel pre-coated glass plates (Whatman PK5F) 150 Å, 1000 μm) and visualized with UV light, and/or ninhydrin, p-anisaldehyde, ammonium molybdate, or ferric chloride. IR spectra were obtained on a Midac M1700 and absorbencies are listed in inverse centimeters. HPLC/MS analysis were performed on a Hewlett Packard 1100 with a photodiode array detector coupled to a Micros Platform II electrospray mass spectrometer. An evaporative light scattering detector (Sedex 55) was also incorporated for more accurate evaluation of sample purity. Reverse phase columns were purchased from YMC, Inc. (ODS-A, 3 μm, 120 Å, 4.0×50 mm).

Solvent system A consisted of 97.5% MeOH, 2.5% $H_2O$, and 0.05% TFA. Solvent system B consisted of 97.5% $H_2O$, 2.5% MeOH, and 0.05% TFA. Samples were typically acquired at a mobile phase flow rate of 2 ml/min involving a 2 minute gradient from solvent B to solvent A with 5 minute run times. Resins were washed with appropriate solvents (100 mg of resin/1 ml of solvent). Technical grade solvents were used for resin washing.

Example 1

Fmoc-protected Rink resin (500 mg, 0.6 mmol/g, 0.30 mmol) was first treated with 5 mL of 20% piperidine in DMF for 30 minutes at room temperature and washed several times with DMF, MeOH, and DCM. The deprotected resin was then treated with 5 mL of a keto-aldehyde solution (0.8M in MeOH/THF, 1:1), 2 mL of $ZnCl_2$ solution (1M in ether), 5 ML of Fmoc-protected α-amino acid solution (0.8M in THF), and 2 mL of isocyanide solution (2M in MeOH). The reaction mixture was mixed for 2 days at room temperature. The resin was collected and washed with DMF, MeOH, DCM several times.

Example 2

The same procedure described above for the preparation of Example 1 was followed except that an α- or β-amino acid Rink amide resin was used instead of Rink resin.

Example 3

The same procedure described above for the preparation of Example 1 was followed except that an α- or β-amino acid Wang resin was used instead of Rink resin.

Example 4

The same procedure described above for the preparation of Example 1 was followed except that an α- or β-amino acid Merrifield resin was used is instead of Rink resin, and a Boc-protected α-amino acid was used in the 4-component condensation reaction instead of an Fmoc-protected amino acid.

Example 5

The same procedure described above for the preparation of Example 1 was followed except that an α- or β-amino acid Rink amide resin was used instead of Rink resin, and a Boc-protected 2-aminobenzoic acid was used in the 4-component condensation reaction instead of an Fmoc-protected amino acid.

Example 6

The same procedure described above for the preparation of Example 1 was followed except that an α- or β-amino acid Wang resin was used instead of Rink resin, and a Boc-protected 2-aminobenzoic acid instead ofa Fmoc-protected amino acid.

Example 7

The same procedure described above for the preparation of Example 1 was followed except that a 2-amino benzoic acid Merrifield resin was used instead of Rink resin, and a Boc-protected α-amino acid was used in the 4-component condensation reaction instead of an Fmoc-protected amino acid.

Example 8

Synthesis of a pyrazinone derivative. Example 8, via a solid support template (Example 1) wherein $R_2$=phenol, $R_3$=n-butyl, $R_4$=H and $R_5$=benzyl (also see Scheme 2):

1. Ugi reaction: The solid support template, Example 1, prepared as described in Scheme 1. The de-protected Rink resin (500 mg, 0.8 mmol/g) was treated with 5 mL of phenylglyoxal solution (0.8M in MeOH/THF, 1:1), 2 mL of $ZnCl_2$ (1M in ether), 5 mL of Fmoc-Phe-OH solution (0.8M in THF), and 2 mL of n-butylisocyanide solution (2M in MeOH). The reaction mixture was mixed for 2 days at room temperature. The resin was collected and washed with DMF, MeOH, DCM several times.
2. Deprotection: The resin from the previous step was treated with 5 mL of 20% piperidine in DMF for 30 minutes at room temperature to remove Fmoc protecting group, and then washed several times with DMF, MeOH, and DCM.
3. Cleavage: Prior to cleavage, the resin was treated with 5 mL of 10% acetic acid in DCM over night and washed with MeOH/DCM, DCM. The resin was then mixed with 5 mL of 20% trifluoroacetic acid (TFA) in DCM for 30 minutes at room temperature. The cleavage solution was collected via filtration and concentrated to afford the desired product (>90% purity based on LC-MS analysis). MS (ES) m/e (relative intensity): 362 (M+H$^+$, 50).

Example 9

Synthesis of a pyrazinone derivative, Example 9, via a solid support template (Example 3) wherein n=1. $R_2$=phenol, $R_3$=t-butyl, $R_4$=H and $R_5$=benzyl, $R_{10}$=$R_{11}$=H (also see Scheme 2):

Ugi reaction and deprotection: The same procedure described in the steps 1 and 2 of Example 8 was followed except that the polymer-bound amine obtained from the corresponding β-Ala-Wang resin was used instead of Rink resin.

Oxidation: The above resin was treated with 0.2M DDQ in benzene (2 mL/100 mg of the resin) at room temperature for 8 h. The resin was filtered and washed with DMF (3x), MeOH (3x), DCM (3x), 0.2 M DIEA in DCE (2x), MeOH/DCM (3x), and DCM (3x). After drying in vacuo for 2 h, the resin was subjected to the cleavage.

Cleavage: The resin was then mixed with 20% trifluoroacetic acid in DCM (2 mL/100 mg of the resin) for 30 minutes at room temperature. The cleavage solution was collected via filtration and concentrated to afford the desired product product (>85% purity based on LC-MS analysis). MS (ES) m/e (relative intensity): 434 (M+H$^+$, 80).

Example 10

Synthesis of an imidiazole derivative, Example 10, via a solid support template (Example 4) wherein n=1. $R_2$=phenol, $R_3$=n-butyl, $R_4$=H $R_5$=methyl, $R_{10}$=$R_{11}$=H (also see Scheme 3):

1. Imidiazole formation: The resin-bound template, Example 4, prepared from the corresponding β-Ala-Merrifield resin (500 mg, 0.6 mmol/g, 0.3 mmol), was reated with 5 mL of 4M ammonium acetate solution in acetic acid at 105° C. for 20 hours. After cooling down to room temperature, the resin was filtered and washed several times with DMF, MeOH, and DCM.
2. Deprotection: The resin obtained above was treated with 5 mL of 20% TFA in DCM and mixed at room temperature for 30 minutes. The resin was then filtered and washed once with MeOH and 1M DIEA in DCE, 3 times with MeOH and DCM. The resin was finally dried at room temperature by purging nitrogen gas for 10 minutes.
3. Sulfonylation: The dried resin from step 2 was treated with 4 mL of phenyl sulfonylchloride solution (0.5M in DCE) and 4 mL of DMAP solution (0.1M in pyridine and DCE, 6:4, v/v). After mixing at room temperature for 16 h, the resin was filtered and washed several times with DMF, MeOH, and DCM.
4. Cleavage: The resin from step 3 was treated with 5 mL of a 1:1 mixture of 40% aqueous methylamine and THF and mixed at room temperature overnight. The cleavage solution was collected in cleavage vials and concentrated to give the expected crude imidiazole derivative (>70% purity based on LC-MS analysis). MS (ES) m/e (relative intensity): 512 (M+H$^+$, 100).

Example 11

Synthesis of a benzodiazopinone derivative. Example 11, via a solid support template (Example 6) wherein n=1. $R_2$=phenol, $R_3$=tert-butyl. $R_4$=H $R_{18}$=H, $R_{10}$=$R_{11}$=H and Pg=Boc (also see Scheme 2):

The polymer-bound template, Example 6, prepared from the corresponding β-Ala-Merrifield resin (500 mg, 0.6 mmol/g, 0.30 mmol), was treated with 5 mL of 20% TFA in DCM and mixed at room temperature for 30 minutes. The cleavage solution was collected in cleavage vials and concentrated to give the expected crude benzodiazepinone derivative (>85% purity based on LC-MS analysis). MS (ES) m/e (relative intensity): 408 (M+H$^+$, 60).

Example 12

Synthesis of an imidiazole derivative. Example 12, via a solid support template (Example 4) wherein n=1. $R_2$=phenyl. $R_3$=n-butyl, $R_4$=H $R_5$=methyl, $R_{10}$=$R_{11}$=H (also see Scheme 3):

1. Imidiazole formation: The polymer-bound template, Example 4, prepared from the corresponding Boc-Ala-Merrifield resin (500 mg, 0.6 mmol/g, 0.30 mmol), was treated with 5 mL of 4M ammonium acetate solution in acetic acid at 105° C. for 20 hours. After cooling down to room temperature, the resin was filtered and washed several times with DMF, MeOH, and DCM.
2. Deprotection: The resin obtained from step 1 was treated with 5 mL of 20% TFA solution in DCM and mixed at room temperature for 30 minutes. The resin was then filtered and washed once with MeOH and 1M DIEA in DCE, 3 times with MeOH and DCM. The resin was finally dried at room temperature by purging nitrogen gas for 10 minutes.
3. Urea formation: The dried resin from step 2 was treated with 5 mL of phenyl isocyanate solution (0.5M in DCE). After mixing at room temperature for 6 h, the resin was filtered and washed several times with DMF, MeOH, and DCM.
4. Cleavage: The resin from step 3 was treated with 5 mL of a 1:1 mixture of 40% aqueous methylamine and THF and mixed at room temperature overnight. The cleavage solution was collected in cleavage vials and concentrated to give the expected crude imidiazole methyl amide derivative (>70% purity based on LC-MS ananlysis). MS (ES) m/e (relative intensity): 491 (M+H$^+$, 100).

Example 13

Synthesis of a diazepine-imidiazole derivative, Example 13, via a solid support template (Example 4) wherein n=1. $R_2$ =phenyl, $R_3$=n-butyl, $R_4$=H $R_5$=benzyl, $R_{10}$=$R_{11}$=H (also see Scheme 4):

1. Imidiazole formation: The polymer-bound template, Example 4, prepared from the corresponding Boc-Phe-Merrifield resin (500 mg, 0.8 mmol/g, 0.40 mmol), was treated with 5 mL of 4M ammonium acetate solution in acetic acid at 100° C. for 12 hours. After cooling down to room temperature, the resin was filtered and washed several times with DMF, MeOH, and DCM.
2. Deprotection: The resin from step 1 was treated with 5 mL of 20% TFA in DCM and mixed at room temperature for 30 minutes. The resin was then filtered and washed once with MeOH and 1M DIEA in DCE, 3 times with MeOH and DCM. The resin was finally dried at room temperature by purging nitrogen gas for 10 minutes.
3. Cleavage: The resin obtained from step 2 was treated with 5 mL of a 2:1:1 mixture of DEA/TEA/THF and the slurry was mixed at room temperature for 3~4 days. The cleavage solution was collected in cleavage vials and concentrated to give the expected diazepine-imidiazole derivative (>90% purity based on LC-MS ananlysis). MS (ES) m/e (relative intensity): 417 (M+H$^{+, 100}$).

Example 14

Synthesis of a benzodiazepine-imidiazole derivative, Example 14, via a solid support template (Example 7) wherein $R_2$=phenyl, $R_3$=n-butyl, $R_4$=H, $R_5$=benzyl, $R_{18}$=H (also see Scheme 4):

1. Imidiazole formation: The polymer-bound template, Example 7, prepared from the corresponding 2-aminobenzoate Merrifield resin (500 mg, 0.8 mmol/g, 0.40 mmol), was treated with 5 mL of 4M ammonium acetate solution in acetic acid at 100° C. for 12 hours. After cooling down to room temperature, the resin was filtered and washed several times with DMF, MeOH, and DCM.
2. Deprotection: The resin from step 1 was treated with 5 mL of 20% TFA in DCM and mixed at room temperature for 30 minutes. The resin was then filtered and washed once with MeOH and 1M DIEA in DCE, 3 times with MeOH and DCM. The resin was finally dried at room temperature by purging nitrogen gas for 10 minutes.
3. Cleavage: The resin from step 2 was treated with 5 mL of a 2:1:1 mixture of diethylamine/triethylamine/THF and mixed at room temperature for 3~4 days. The cleavage solution was collected in cleavage vials and concentrated to give the expected benzodiazepine-imidiazole derivative (>95% purity based on LC-MS ananlysis). MS (ES) m/e (relative intensity): 465 (M+H$^+$, 80).

Example 15

Solid phase synthesis of an array of pyrazinone derivatives via a solid support template. Example 2 (n=1). based on the method described in Scheme 2:

Step 1: A library of 96 compounds was synthesized based on the scheme described above, wherein 3-aminobutyramide Rink resin, cyclohexylisocyanide, 12 Boc-protected α-amino acids ($R_2$) in row and 8 ketoaldehydes ($R_3$) in column were used in the first step, the four-component Ugi condensation reaction in a 96-well reaction block on an ACT synthesizer.

| Boc-AA/row | Ketoaldehydes/column |
|---|---|
| #1 Boc-Leu | #1 Phenylglyoxal |
| #2 Boc-Ile | #2 4-Fluorophenylglyoxal |
| #3 Boc-Asp(OBzl) | #3 4-Methoxyphenylglyoxal |
| #4 Boc-Gly | #4 4-Hydroxyphenylglyoxal |
| #5 Boc-Ala | #5 4-Cyclohexylphenylglyoxal |
| #6 Boc-Phe | #6 4-Nitrophenylglyoxal |
| #7 Boc-Trp | #7 2-Naphthylglyoxal |
| #8 Boc-Thr(Bzl) | #8 4-Aminoacetylphenylglyoxal |
| #9 Boc-Ser(Bzl) | |
| #10 Boc-Thr | |
| #11 Boc-Phg | |
| #12 Boc-Tyr | |

Step 2 (Cyclization and cleavage): In each well 1 mL of 25% TFA solution in DCM was dispensed and shaken for 30 min at room temperature over a cleavage block. The cleavage solutions were collected in 96 cleavage vials by vacuum filtration, then washed twice by 1 mL of 5% TFA solution in DCM. To the combined filtrate was added 0.25 mL toluene and evaporated under reduced pressure in GeneVac. Acetonitrile/water mixture (1:1, 0.5 mL) was added to each well and The solutions were evaporated to give a library of 96 pyrazinone derivatives.

Analytical results (19 compounds were randomly chosen for LC-MS analysis):

| Entry | Boc-AA | Ketoaldehydes | Purity[a] |
|---|---|---|---|
| 1 | Boc-Leu | 4-Hydroxyphenylglyoxal | 70% |
| 2 | Boc-Ile | Phenylglyoxal | 75% |
| 3 | Boc-Ile | 4-Nitrophenylglyoxal | 80% |
| 4 | Boc-Asp(OBzl) | 4-Methoxyphenylglyoxal | 70% |
| 5 | Boc-Asp(OBzl) | 4-Aminoacetylphenylglyoxal | 70% |
| 6 | Boc-Gly | 4-Cyclohexylphenylglyoxal | 60% |
| 7 | Boc-Ala | 4-Fluorophenylglyoxal | 70% |
| 8 | Boc-Ala | 2-Naphthylglyoxal | 70% |
| 9 | Boc-Phe | 4-Hydroxyphenylglyoxal | 60% |
| 10 | Boc-Trp | Phenylglyoxal | 50% |
| 11 | Boc-Trp | 4-Nitrophenylglyoxal | 75% |
| 12 | Boc-Thr(Bzl) | 4-Methoxyphenylglyoxal | 60% |
| 13 | Boc-Thr(Bzl) | 4-Aminoacetylphenylglyoxal | 25% |
| 14 | Boc-Ser(Bzl) | 4-Cyclohexylphenylglyoxal | 50% |

-continued

| Entry | Boc-AA | Ketoaldehydes | Purity[a] |
|---|---|---|---|
| 15 | Boc-Thr | 4-Fluorophenylglyoxal | 50% |
| 16 | Boc-Thr | 2-Naphthylglyoxal | 30% |
| 17 | Boc-Phg | 4-Hydroxyphenylglyoxal | 70% |
| 18 | Boc-Tyr | Phenylglyoxal | 50% |
| 19 | Boc-Tyr | 4-Nitrophenylglyoxal | 90% |

[a]Purity was determined by LC-MS analysis.

As will be understood by those skilled in the art, various arrangements which lie within the spirit and scope of the invention other than those described in detail in the specification will occur to those persons skilled in the art. It is therefor to be understood that the invention is to be limited only by the claims appended hereto.

Having defined the invention we claim:

1. A support template for the synthesis of highly functionalized heterocyclic scaffolds and analogues, said template having the formula:

wherein;

P is a support,

L is a multifunctional linker, $R_1$ is selected from a group consisting of a covalent bond and a multifunctional chemical monomer possessing at least two attachment points, A is selected from the group consisting of Pg is a protecting group, $R_2$, $R_3$, $R_4$, $P_5$, $R_6$ and $R_7$ are independently selected from a group consisting of hydrogen, substituted alkyl, substituted alkenyl, substituted alkenylaryl, substituted alkynyl, substituted aryl, substituted heteroaryl, substituted alkylaryl, substituted cycloalkyl and substituted cycloalkenyl, substituted heterocyclyl;

$R_4$ and $R_5$ taken in combination, are substituted saturated heterocycles;

$R_6$ and $R_7$ taken in combination, are substituted cycloalkyl and substituted saturated heterocycles; and $R_8$ and $R_9$ taken in combination are substituted aromatic or heteroaromatic rings.

2. The support of claim 1 wherein $R_1$ is derived from an α- or β-amino acid.

3. The support of claim 1 wherein $R_1$ is derived from an 2-aminobenzoic acid and A is derived from an α-amino acid.

4. The support of claim 1 wherein $R_1$ is selected from the group consisting of Phenylalanine or β-alanine.

5. The support of claim 1 wherein said support is selected from the group consisting of insoluble resins and solubilizable resins that can be rendered insoluble during the synthesis process as solid phase supports.

6. The support of claim 1 wherein L is a multifunctional chemical monomer in which one functional group reacts with said support to form a covalent bond and at least one other functional group reacts with $R_1$.

7. A support template having the formula:

wherein;

X is O, NH or S;

n is 0 or 1;

A is derived from an N-protected α-amino acid

Pg is a protecting group;

$R_2$, $R_3$, $R_4$, $R_5$, $R_6$, $R_7$, $R_{10}$ and $R_{11}$ are independently selected from a group consisting of hydrogen, substituted alkyl, substituted alkenyl, substituted alkenylaryl, substituted alkynyl, substituted aryl, substituted alkylaryl, substituted cycloalkyl and substituted cycloalkenyl; or

$R_{10}$ is selected from a group consisting of substituted amino, substituted hydroxyl, substituted sulfhydryl, substituted alkyl sulfonamido, substituted alkyl carboxamido, substituted alkyl ureido, substituted alkyl sulfamido, substituted alkyloxycarboxamido, substituted arylalkyl sulfonamido, substituted arylalkyl carboxamido, substituted arylalkyl ureido, arylalkyl sulfamido and substituted arylalkyloxycarboxamido; or $R_4$ and $R_5$ taken in combination, are substituted saturated heterocycles; or $R_6$ and $R_7$ taken in combination, are substituted cycloalkyl and substituted saturated heterocycles; and $R_8$ and $R_9$ taken in combination are substituted aromatic or heteroaromatic rings.

8. A support template having the formula:

wherein;

X is O, NH or S;

Pg is a protecting group;

$R_2$, $R_3$, $R_4$, and $R_5$ are independently selected from a group consisting of hydrogen, substituted alkyl, substituted alkenyl, substituted alkenylaryl, substituted alkynyl, substituted aryl, substituted alkylaryl, substituted cycloalkyl and substituted cycloalkenyl; or $R_4$ and $R_5$ taken in combination, are substituted saturated heterocyles;

$R_{12}$ is selected from a group consisting of hydrogen, hydroxy, thio, cyano, halogen, nitro, substituted alkylamino, substituted arylamino, substituted alkylcarbonylamino, substituted arylcarbonylamino, substituted alkyloxy, substituted aryloxy, substituted thioalkyl, substituted thioaryl, substituted alkyl, substituted alkenyl, substituted alkenylaryl, substituted alkynyl, substituted aryl, substituted alkylaryl, substituted cycloalkyl and substituted cycloalkenyl.

9. A method for the preparation of the support template of claim 1 by Ugi reaction according to the following scheme:

where P-L-$R_1$-$NH_2$ is a polymer-bound free amine, $R_2COCHO$ is an α-ketoaldehyde, $R_3NC$ is an isocyanide and $PgNR_4ACO_2H$ is an N-protected amino acid.

10. The method of claim 9 wherein said amino acid contains a protecting group selected from the group consisting of Fmoc and Boc.

11. The method of claim 9 wherein P-L-$R_1$-$NH_2$ is an α- or β-amino acid Rink amide resin to produce a support having the structure:

where: n=0 or 1, and $NR_4ACO_2H$ is Boc-protected α-amino acid.

12. The method of claim 9 wherein P-L-$R_1$-$NH_2$ is an α- or β-amino acid Wang resin.

13. The method of claim 9 wherein P is an α- or β-amino acid Merrifield resin.

14. The method of claim 9 wherein P-L-$R_1$-$NH_2$ is an α- or β-amino acid Rink amide resin to produce a support having the structure:

where n=0 or 1 and $NR_4ACO_2H$ is Boc-protected aminobenzoic acid.

15. The method of claim 9 wherein P-L-$R_1$-$NH_2$ is an α- or β-amino Wang resin to produce a support having the structure:

where n=0 or 1 and $NR_4ACO_2H$ is Boc-protected aminobenzoic acid.

16. The method of claim 9 wherein P-L-$R_1$-$NH_2$ is a 2-aminobenzoic acid Merrifield resin to produce a support having the structure.

17. A method for the production of a scaffold using the template of claim 1, said method comprising the steps of cleaving said N-protecting group to form a corresponding free amine, cyclizing said free amine to form a moiety selected from the group consisting of a dihydropyrazinone and a diazepinone.

18. The method of claim 17 carried out in accordance with the following scheme:

19. The method of claim 17 further including the step oxidizing said dihydropyrazinone to a pyrazinone.

20. A method for the production of an imidiazole scaffold comprising the steps of:

a. preparing a template in accordance with the method of claim 9;

b. forming an imidazole derivative on said resin by reacting said template with a 4M solution of ammonium acetate in acetic acid; and c. deprotecting and drying said resin.

21. The method of claim 20 wherein said scaffold has the structure:

22. The method of claim 20 further including the steps of reacting said scaffold with an electrophillic reagent, cleaving said resin, collecting and concentrating said cleavage solution to recover an imidazole derivative.

23. The method of claim 22 wherein said electrophillic reagent is selected from the group consisting of sulphonyl chloride, isocyanate, acid chloride and aldehyde.

* * * * *